United States Patent
Yamada (10) Patent No.: US 8,797,583 B2
(45) Date of Patent: Aug. 5, 2014

(54) OBTAINING PRINT DATA FROM A REFERENCE LOCATION AND PRINTING APPROPRIATE PRINT DATA

(75) Inventor: Akihiro Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 109 days.

(21) Appl. No.: 13/472,194

(22) Filed: May 15, 2012

(65) Prior Publication Data

US 2013/0083348 A1    Apr. 4, 2013

(30) Foreign Application Priority Data

Sep. 29, 2011    (JP) .................................. 2011-214022

(51) Int. Cl.
    *G06F 3/12*    (2006.01)
(52) U.S. Cl.
    USPC ....................................................... 358/1.15
(58) Field of Classification Search
    USPC ....................................................... 358/1.15
    See application file for complete search history.

(56) References Cited

U.S. PATENT DOCUMENTS

| 2003/0137691 A1* | 7/2003 | Tanaka .................... 358/1.15 |
| 2006/0221389 A1* | 10/2006 | Meki ..................... 358/1.15 |
| 2007/0139698 A1 | 6/2007 | Sato | |

FOREIGN PATENT DOCUMENTS

| JP | H11-024862 A | 1/1999 |
| JP | 2000-118085 A | 4/2000 |
| JP | 2001-184180 A | 7/2001 |
| JP | 2004-074810 A | 3/2004 |
| JP | 2007-156713 A | 6/2007 |
| JP | 2008-269159 A | 11/2008 |

* cited by examiner

*Primary Examiner* — Eric A Rust
(74) *Attorney, Agent, or Firm* — Baker Botts L.L.P.

(57) ABSTRACT

A first acquiring section acquires, at first timing after a print job is received and before a print instruction is given, first print data located at a reference location indicated by reference information of data included in the print job, and stores the first print data in a storage section. A second acquiring section acquires, at second timing when the print instruction is given, second print data located at the reference location. A difference determining section determines whether the second print data are different from the first print data. A necessity determining section determines whether the second print data are necessary, when the second print data are different from the first print data. A printing section prints the second print data when the second print data are necessary, and prints the first print data when the second print data are unnecessary.

28 Claims, 8 Drawing Sheets

OBTAINING PRINT DATA FROM A REFERENCE LOCATION AND PRINTING APPROPRIATE PRINT DATA

CROSS REFERENCE TO RELATED APPLICATIONS

This application claims priority from Japanese Patent Application No. 2011-214022 filed Sep. 29, 2011. The entire content of the priority application is incorporated herein by reference.

TECHNICAL FIELD

The invention relates to a printing device.

BACKGROUND

A printing device is conventionally known that refers to reference information such as a URL at a preliminary acquisition time specified by a user, that preliminarily acquires print data from a reference location indicated by the reference information, and that stores the print data of the preliminary acquisition time in a storage section such as a RAM. At a main acquisition time specified by the user, the printing device refers to the same reference information as in the preliminary acquisition and determines whether the print data of the preliminary acquisition time is updated. If the print data of the preliminary acquisition time is updated, the printing device acquires print data at the main acquisition time and performs printing.

SUMMARY

In the above-described printing device, however, the printing device prints print data at the main acquisition time, even if the print data of the main acquisition time differ from the print data of the preliminary acquisition time and the print data of the main acquisition time is updated to a content that is not needed by a user.

In view of the foregoing, it is an object of the invention to provide a printing device that facilitates obtaining a print result desired by a user even if print data at the same reference location are different.

In order to attain the above and other objects, the invention provides a printing device. The printing device includes a storage section, a first acquiring section, a second acquiring section, a difference determining section, a necessity determining section, and a printing section. The first acquiring section is configured to acquire, at first timing after a print job is received and before a print instruction is given, first print data located at a reference location indicated by reference information of data included in the print job, and to store the first print data in the storage section. The second acquiring section is configured to acquire, at second timing when the print instruction is given, second print data located at the reference location. The difference determining section is configured to determine whether the second print data are different from the first print data. The necessity determining section is configured to determine whether the second print data are necessary, when the difference determining section determines that the second print data are different from the first print data. The printing section is configured to print the second print data when the necessity determining section determines that the second print data are necessary, and to print the first print data when the necessity determining section determines that the second print data are unnecessary.

According to another aspect, the invention also provides a printing device. The printing device includes a processor, a network interface, a memory, and a printing section. The network interface is connectable to a network. The memory stores a set of program instructions executable by the processor. The set of program instructions comprises: acquiring, at first timing after a print job is received and before a print instruction is given, first print data located at a reference location indicated by reference information of data included in the print job, and storing the first print data in the memory; acquiring, at second timing when the print instruction is given, second print data located at the reference location; determining whether the second print data are different from the first print data; and determining whether the second print data are necessary, when the second print data are different from the first print data. The printing section is configured to print the second print data when the second print data are necessary, and to print the first print data when the second print data are unnecessary.

BRIEF DESCRIPTION OF THE DRAWINGS

Embodiments in accordance with the invention will be described in detail with reference to the following figures wherein.

DETAILED DESCRIPTION

First Embodiment

A printer embodying a printing device according to a first embodiment of the invention will be described while referring to FIGS. 1 through 4. In the present embodiment, the invention is applied to a printer having a function of acquiring print data from a Web page and of performing printing.

[Configuration of Printer]

Figure 1:
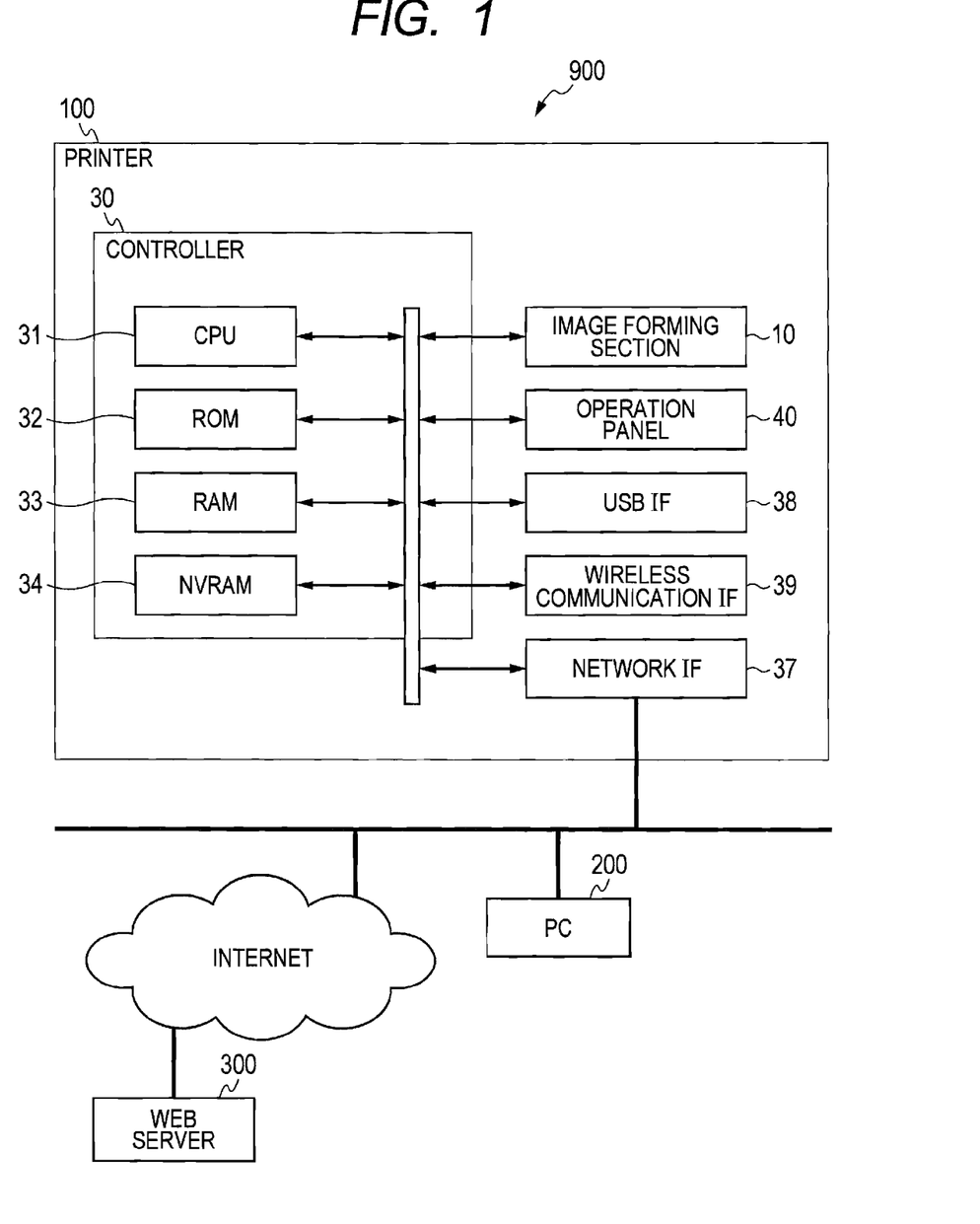
FIG. 1 is a block diagram showing the electrical configuration of a printer according to a first embodiment of the invention.

As shown in FIG. 1, a printer 100 (an example of a printing device) of the present embodiment includes a controller 30 having a CPU 31, a ROM 32, a RAM 33, and an NVRAM (Non Volatile RAM) 34. The controller 30 is electrically connected with an image forming section 10 that prints an image on paper, an operation panel 40 that displays operating conditions and that receives input operations by a user, a network interface 37, a USB interface 38, and a wireless communication interface 39.

The ROM 32 (an example of a memory) stores firmware, various settings, initial values, and the like. The firmware is a control program for controlling the printer 100. The RAM 33 and the NVRAM 34 (the both are an example of a storage section and a memory) are used as a work area to which various control programs are read out, or as a storage area for storing print data temporarily. The NVRAM 34 is also used as a storage area for storing various settings that are set by a user after shipment. Note that a flash ROM may be used instead of the NVRAM 34.

The CPU 31 (an example of an acquiring section, a difference determining section, a necessity determining section, a first reacquiring section, a second reacquiring section, an error determining section, and a processor) controls each element of the printer 100 while storing its processing results in the RAM 33 or in the NVRAM 34 in accordance with control programs read out from the ROM 32 and signals sent from various sensors.

The network interface 37 and the USB interface 38 are interfaces that enable communication with other devices. The printer 100 receives data sent from the other devices via these interfaces. When receiving data, the CPU 31 and the network interface 37 or the USB interface 38 cooperate to serve as an example of a receiving section.

In the present embodiment, the printer 100 performs communication, via the network interface 37, with a personal computer (PC) 200 (an example of an information processing device) in which a printer driver (an example of a transmitting section) for the printer 100 is installed and with a Web server 300 (an example of a reference location) storing a Web page. The printer 100, together with the PC 200 and a communication device such as the Web server 300, constitutes a printing system 900.

In addition, other devices may be used via the USB interface 38. For example, if a flash memory (an example of the storage section) is connected to the USB interface 38, the flash memory can be used as a storage area. Further, if a keyboard is connected, the keyboard can be used to perform input operations.

The image forming section 10 (an example of a printing section) prints an image on paper. Here, a type of forming images may be an electrophotographic type or an inkjet type. Further, the image forming section 10 may be for color printing or only for monochromatic printing.

The operation panel 40 (an example of a receiving section) has various buttons for receiving user inputs and a touch-panel screen for displaying text information, buttons, and the like. The various buttons include, for example, an OK button for starting a print operation, a cancel button for cancelling a print operation, and character buttons for a user to input a URL of a Web page.

The printer 100 of the present embodiment is typically used in the following situation. For example, a user is located at a place where a printer is not available (for example, on the road to an airport), and uses a notebook PC, a smart phone, etc. to send a print job to the printer 100 at a distant location (at the airport) via a network. Then, after the user arrives at the airport, he or she physically operates the printer 100 (that is, gives a print instruction) to print the print job that is sent previously.

[Control by Printer]

Next, controls by the printer 100 will be described. The printer 100 of the first embodiment has a Web-page printing function of acquiring URL information (Uniform Resource Locator information) for referring to a Web page, acquiring print data (contents) from the Web page based on the URL information, and printing the contents.

When performing Web page printing, a URL information registration process is executed. First, a user sends URL information for referring to a Web page, as well as a password, from the PC 200 to the printer 100. The printer 100 stores the URL information received via the network interface 37 in the NVRAM 34.

Then, immediately after the printer 100 receives the URL information, the printer 100 accesses the Web page based on the URL information, downloads print data from the Web page, and stores the downloaded print data in the NVRAM 34. Note that these processes are executed before the user operates the operation panel 40 to input an instruction for performing Web page printing (an example of a print instruction). The print data stored in the NVRAM 34 include contents desired by the user.

The user operates the operation panel 40 to input an instruction for performing Web page printing. Upon an input of the instruction, the printer 100 displays a selection screen for selecting URL information stored in the NVRAM 34. The user selects URL information of the Web page on the selection screen, inputs the password, and inputs the instruction for performing Web page printing. For example, in order to print information of a Web page stored in a certain directory of the Web server 300 (see FIG. 1), the user selects URL information including the directory path. Then, the user inputs the password on the operation panel 40 and presses the OK button of the operation panel 40. Note that, if a print job does not include URL information, for example, a filename of print data is displayed on the selection screen. Then, the user selects the filename on the selection screen, inputs the password, and inputs the instruction for performing printing.

If the password matches, the printer 100 accesses the directory of the Web server 300 based on the selected URL information, and downloads print data and stores the print data in the RAM 33.

Then, the printer 100 determines whether the downloaded print data are identical to print data stored in the NVRAM 34 and linked with each other with the same URL information.

If the printer 100 determines that the print data downloaded and stored in the RAM 33 are not identical to the print data stored in the NVRAM 34 and having the same URL information, the printer 100 determines whether printing of the print data stored in the RAM 33 is necessary.

If it is determined that printing of the downloaded print data is unnecessary, the printer 100 erases the downloaded print data from the RAM 33 and performs printing of the print data stored in the NVRAM 34.

If it is determined that printing of the downloaded print data is necessary, the printer 100 performs printing of the downloaded print data. After the print data are printed, the printer 100 erases the downloaded print data from the RAM 33 and erases the print data stored in the NVRAM 34.

[Status Code]

In the present embodiment, the printer 100 determines that an update made in the downloaded print data is unnecessary, if the downloaded print data include a character string that is the same as one of the status codes listed below.

403: Forbidden
404: Not Found
502: Bad Gateway
503: Service Unavailable

These status codes are classified into two groups. Depending on which group a status code belongs to, processes are different after it is determined that an update in the downloaded print data is unnecessary.

(1) Print the Print Data Stored in the NVRAM 34

If the printer 100 receives a status code of "403: Forbidden" or "404: Not Found", it is likely that an access right is set erroneously in the Web server 300, or the like. In this case, it is expected that it takes time of approximately one hour or longer, considering time in which an administrator of the Web server 300 receives notification and corrects the settings. Hence, the user obtains desired print result by printing the print data stored in the NVRAM 34, rather than printing the downloaded print data including a character string of "403: Forbidden" or "404: Not Found". For example, if the print target is information that is not updated in a short period of time, such as a map and a train timetable, print data that are not the latest data would be still useful. Thus, it is likely that the user obtains a desired print result.

(2) Reacquire Print Data From URL Information Stored in the NVRAM 34

If the printer 100 receives a status code of "502: Bad Gateway" or "503: Service Unavailable", it is likely that a load on the Web server 300 increases or that the Web server 300 is temporarily unavailable due to maintenance of the Web server 300. Hence, the printer 100 sets a predetermined waiting time prior to reacquisition of print data, acquires the latest print data when an error is recovered in the Web server 300, and prints the latest print data. Hence, it is likely that the user obtains desired print result by printing the latest print data, rather than printing the print data stored in the NVRAM 34. For example, if the print target is information that is updated in a short period of time, such as a stock market information and a weather forecast, it is expected that the user desires the latest print data. Thus, it is likely that the user obtains desired print result by printing the latest print data, rather than printing the print data stored in the NVRAM 34.

[URL Information Registration Process]

Figure 2:
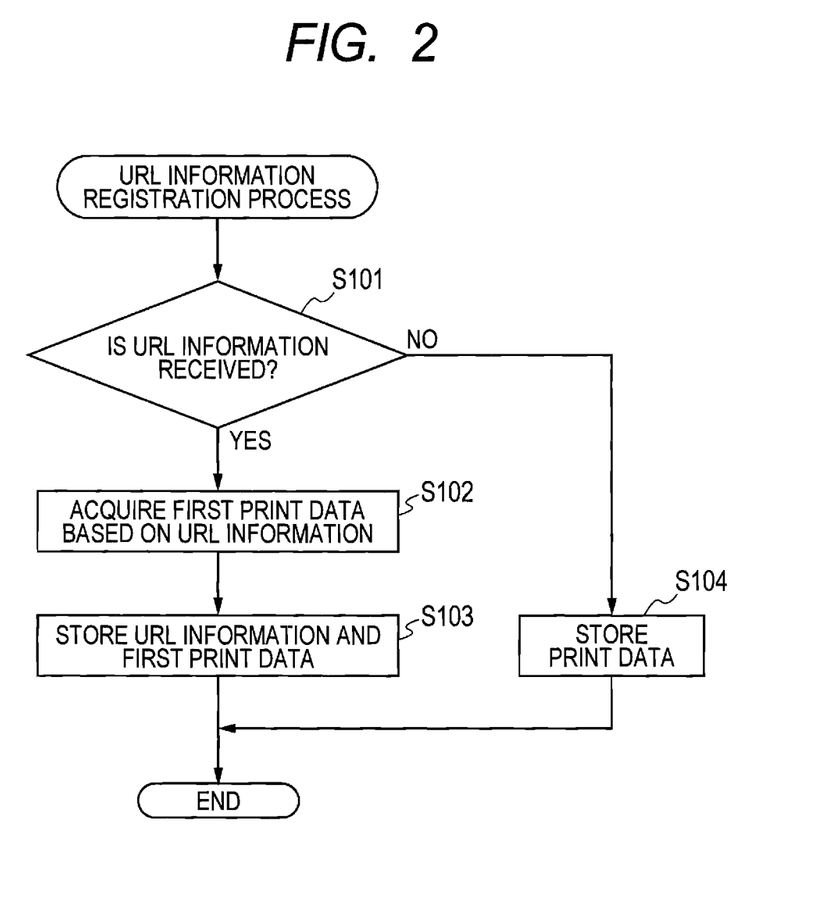
FIG. 2 is a flowchart showing steps in a URL information registration process.

Next, the above-mentioned URL information registration process will be described while referring to the flowchart of FIG. 2. The CPU 31 starts the URL information registration process upon receipt of a print job as a trigger.

In the URL information registration process, first, the CPU 31 determines whether URL information for referring to a Web page is received when the print job is received (S101, an example of a receiving section).

If it is determined that the URL information is received (S101: Yes), the CPU 31 accesses the Web page based on the URL information and acquires print data (hereinafter referred to as "first print data" (S102).

The CPU 31 then stores the first print data in association with the URL information in the NVRAM 34 (S103), and ends the URL information registration process.

If the CPU 31 determines that URL information is not received in S101 (S101: No), the CPU 31 stores, in the NVRAM 34, the print data that are already received at a starting point of the URL information registration process as the print job (S104). Then, the URL information registration process ends.

[Printing Process]

Figure 3:
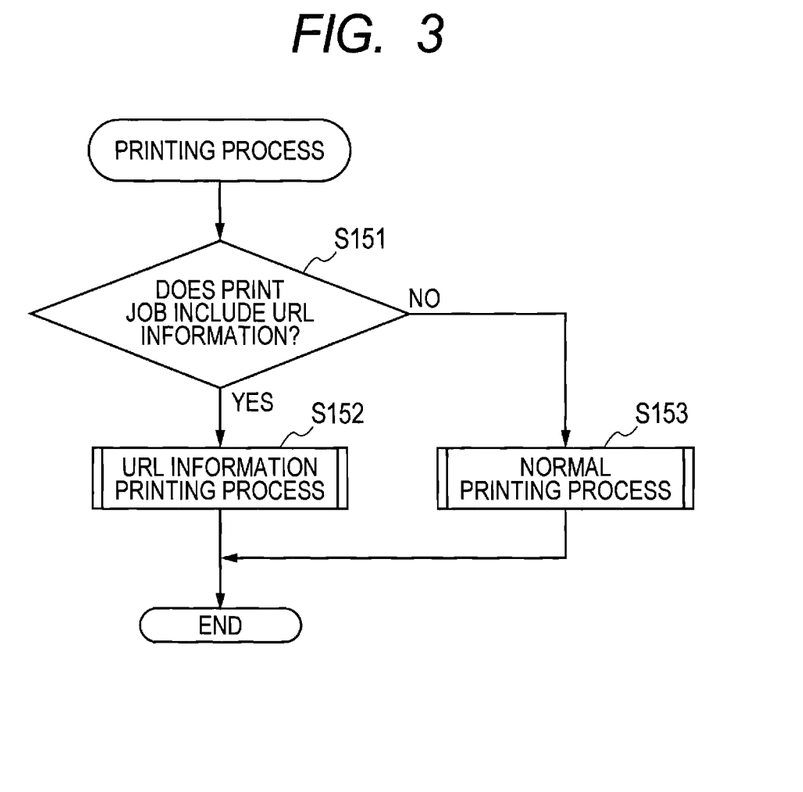
FIG. 3 is a flowchart showing steps in a printing process.

Next, a printing process of printing a print job will be described while referring to the flowchart of FIG. 3. The CPU 31 starts the printing process when a password is inputted and the OK button is pressed on the operation panel 40 (as a trigger) after URL information or a filename is selected.

In the printing process, the CPU 31 determines whether the print job includes URL information (S151), that is, whether URL information for referring to a Web page is received when the print job is received. If the print job includes URL information (S151: Yes), the CPU 31 proceeds to S152 and executes a URL information printing process shown in FIG. 5. If the print job does not include URL information (S151: No), the CPU 31 proceeds to S153 and executes a normal printing process shown in FIG. 4. Then, the printing process ends.

[Normal Printing Process]

Figure 4:
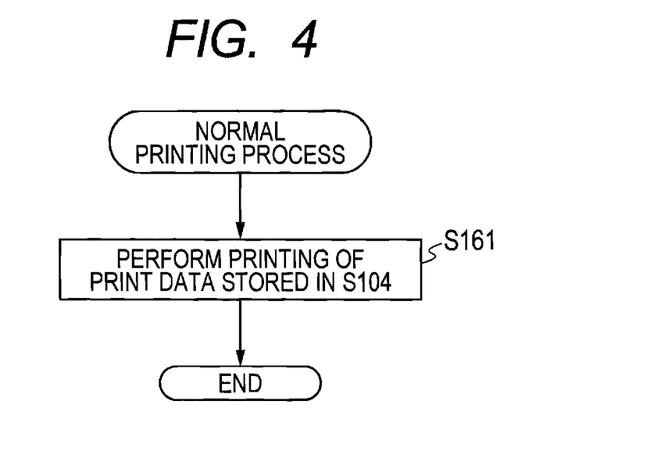
FIG. 4 is a flowchart showing steps in a normal printing process.

Next, the normal printing process will be described while referring to the flowchart of FIG. 4. In the normal printing process, the CPU 31 controls the image forming section 10 to perform printing of the print data stored in S104 of FIG. 2 (S161). Then, the normal printing process ends.

[URL Information Printing Process]

Next, the URL information printing process of printing a URL job will be described while referring to the flowchart of FIG. 5. In the URL information printing process, first, the CPU 31 accesses a directory of the Web server 300 based on the URL information selected by the user, downloads print data (hereinafter referred to as "second print data"), and stores the print data in the RAM 33 (S201, an example of an acquiring section).

Next, the CPU 31 determines whether the second print data differ from the first print data (S202, an example of a difference determining section). In determination of S202, the CPU 31 compares character strings of the second print data and the first print data and, if a matching ratio is larger than or equal to a predetermined probability, determines that the second print data are identical to the first print data.

If the CPU 31 determines that the second print data differ from the first print data (S202: Yes), the CPU 31 executes a print-target determining process described later (S203).

[Print-Target Determining Process]

Figure 6:
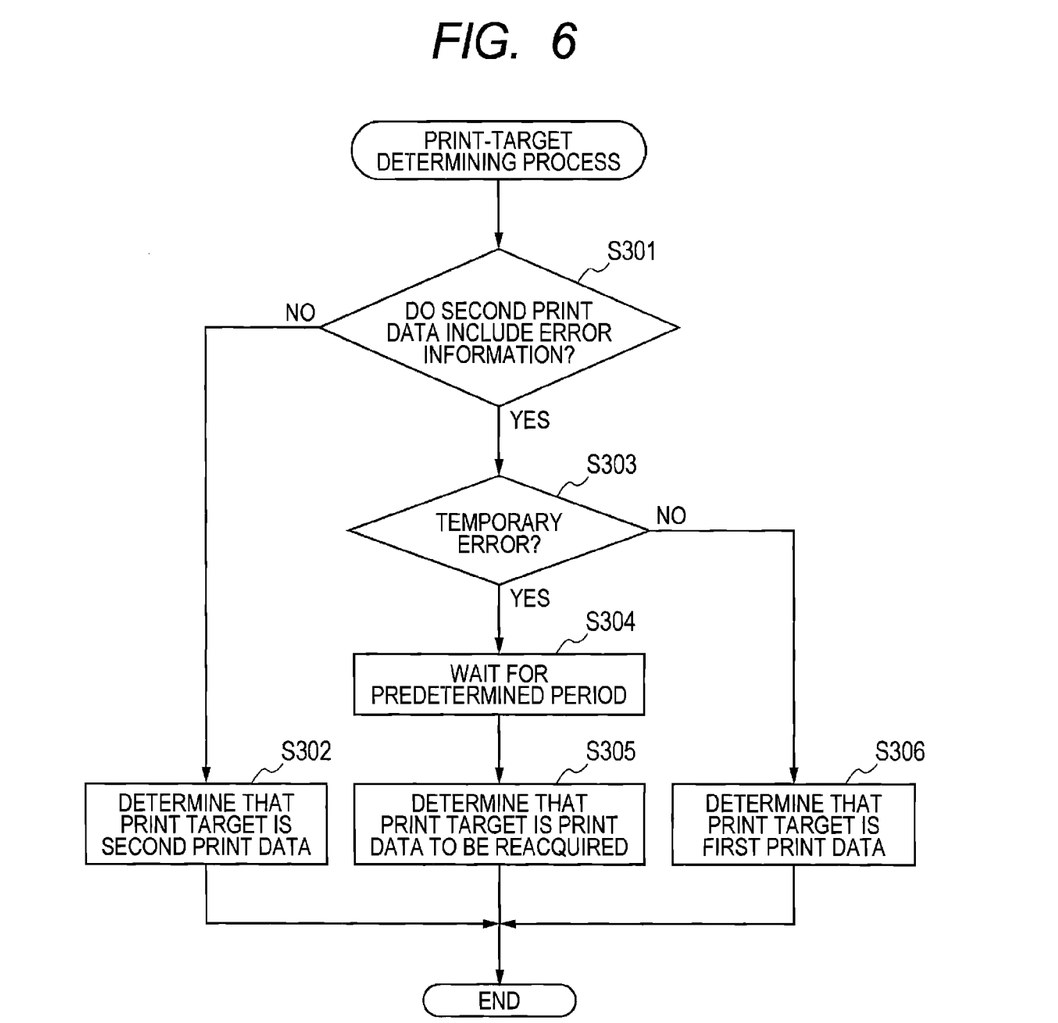
FIG. 6 is a flowchart showing steps in a print-target determining process according to the first embodiment.

The print-target determining process according to the first embodiment will be described while referring to FIG. 6. The print-target determining process is a process for determining which print data are to be printed among the first print data, the second print data, and print data reacquired from the Web server 300 based on URL information selected by the user.

In the print-target determining process, first, the CPU 31 determines whether the second print data include error information (S301, an example of a necessity determining section and an error determining section). This determination in S301 is performed by determining whether the second print data include a character string that is the same as the status code of "403: Forbidden", "404: Not Found", "502: Bad Gateway", or "503: Service Unavailable".

That is, if the second print data include a character string that is the same as the above-described status code (S301: Yes), it is difficult to obtain a print result desired by the user even if the second print data are printed. Thus, in S301, the CPU 31 determines that printing of the second print data is unnecessary (S301: Yes).

If it is determined that the second print data do not include error information (S301: No), the CPU 31 determines that the print target is the second print data (S302) and ends the print-target determining process.

If it is determined that the second print data include error information (S301: Yes), the CPU 31 determines whether the error information indicates a temporary error based on the character string of the status code (S303, an example of an error determining section). In S303, the CPU 31 determines that the error information indicates a temporary error if the second print data include a character string that is the same as the status code of "502: Bad Gateway" or "503: Service Unavailable".

If it is determined that the error information indicates a temporary error (S303: Yes), the CPU 31 waits for a predetermined period so that the temporary error is recovered (S304), determines that the print target is print data that are reacquired from the Web server 300 based on URL information selected by the user (S305), and ends the print-target determining process.

If it is determined that the error information does not indicate a temporary error (S303: No), the CPU 31 determines that the print target is the first print data (S306) and ends the print-target determining process.

Figure 5:
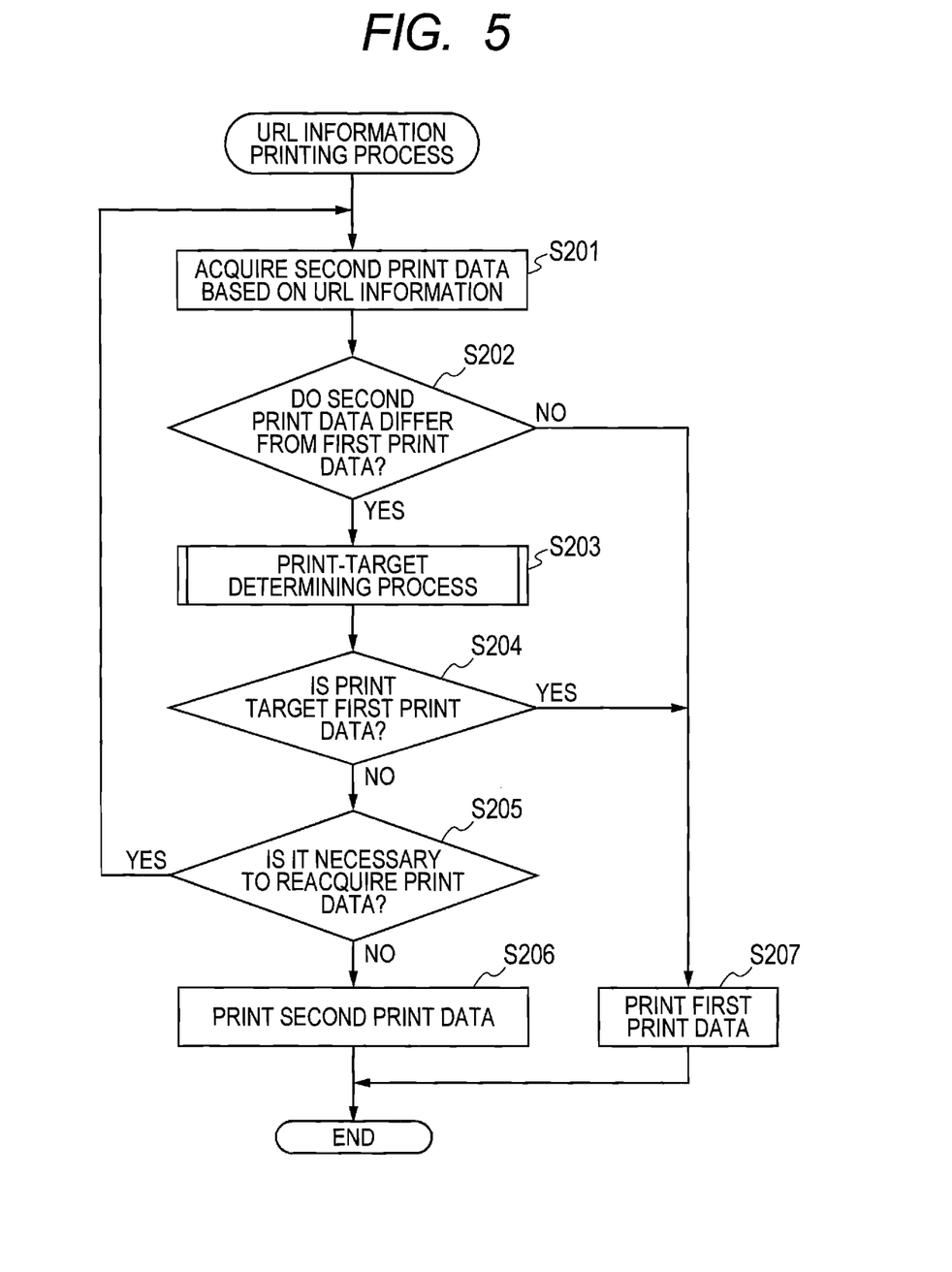
FIG. 5 is a flowchart showing steps in a URL information printing process.

Returning to the URL information printing process in FIG. 5, subsequent to the print-target determining process in S203, the CPU 31 determines whether the first print data are to be printed (S204). This determination in S204 is performed, for example, by determining whether it is determined in the print-target determining process that the print target is the first print data.

If it is determined that the first print data are not to be printed (S204: No), the CPU 31 determines whether it is necessary to reacquire print data (S205). This determination in S205 is performed, for example, by determining whether it is determined in the print-target determining process that the print target is print data reacquired from the Web server 300 based on URL information selected by the user.

If it is determined that it is unnecessary to reacquire print data (S205: No), the CPU 31 controls the image forming section 10 to perform printing of the second print data (S206) and ends the URL information printing process. Note that, in S205, the CPU 31 may determine whether the print target is the second print data. In this modification, the CPU 31 proceeds to S206 if the CPU 31 determines that the print target is the second print data, and returns to S201 if the CPU 31 does not determine that the print target is the second print data.

If it is determined that it is necessary to reacquire print data (S205: Yes), the CPU 31 reacquires print data from the Web server 300 based on URL information selected by the user (S201, an example of a first reacquiring section), and executes processes in S202-S205 for the reacquired print data.

Note that, if the CPU 31 determines that the second print data are identical to the first print data (S202: No), the CPU 31 controls the image forming section 10 to print the first print data (S207) and ends the URL information printing process. Alternatively, the CPU 31 may control the image forming section 10 to print the second print data. This is because the first print data are substantially identical to the second print data.

If it is determined that the first print data are to be printed (S204: Yes), the CPU 31 controls the image forming section 10 to print the first print data (S207) and ends the URL information printing process.

Advantageous Effects of the First Embodiment

As described above in detail, in the printer 100 according to the first embodiment, if the CPU 31 determines that the first print data differ from the second print data (S202: Yes), the CPU 31 executes the print-target determining process (S203). And, in the print-target determining process in S203, if the CPU 31 determines that the second print data do not include error information (S301: No), the CPU 31 determines that the print target is the second print data (S302). If the CPU 31 determines that the second print data include error information (S301: Yes), the CPU 31 determines whether the error information indicates a temporary error (S303). If the CPU 31 determines that the error information does not indicate a temporary error (S303: No), the CPU 31 determines that the print target is the first print data (S306) and ends the print-target determining process.

That is, if it is determined that the second print data are unnecessary, the CPU 31 controls the image forming section 10 to print the first print data (S207). Thus, even if the first print data differ from the second print data, the first print data including the user's desired content are printed, and it is likely that the user obtains a desired print result.

Note that, by determining necessity of printing, printing of unnecessary print data can be prevented (necessity determining section). In addition, consumables such as toner and paper can be saved.

Further, the CPU 31 determines whether the second print data include error information (S301). If it is determined that the second print data include error information (S301: Yes), the CPU 31 determines that the print target is either print data to be reacquired from the Web server 300 based on URL information selected by the user (S305) or the first print data (S306).

That is, the CPU 31 controls the image forming section 10 to perform printing of print data that do not include error information. Thus, print data that do not include error information are printed, and it is likely that the user obtains a desired print result.

If it is determined that the error information indicates a temporary error (S303: Yes), the CPU 31 waits for a predetermined period so that the temporary error is recovered (S304), and determines that the print target is print data that are reacquired from the Web server 300 based on URL information selected by the user (S305). Because the processes in S202-S205 are executed for the reacquired print data, it is likely that the printer 100 prints print data that are newer than the first print data and that are reacquired from the Web server 300 based on URL information selected by the user. Thus, it is likely that the user obtains a desired print result.

Further, the CPU 31 starts the URL information printing process when a password is inputted and the OK button is pressed on the operation panel 40 (as a trigger) after URL information is selected. This prevents a situation in which printing is performed prior to receiving pressing of the OK button on the operation panel 40. Thus, a print result is obtained at timing when the user desires the print result.

Further, in the URL information printing process, the CPU 31 stores the URL information and the first print data in the NVRAM 34 (S103). Hence, it is unnecessary to acquire the first print data while the CPU 31 is performing other controls. This reduces a load on the CPU 31.

Second Embodiment

The second embodiment differs from the first embodiment in the print-target determining process. In the print-target determining process of the second embodiment, if the second print data include a predetermined character string, print data are reacquired from other URL information indicated in a source code of a Web page.

More specifically, in the URL information printing process of FIG. 5, if the CPU 31 determines that it is necessary to reacquire print data (S205: Yes), the CPU 31 reacquires print data from the Web server 300 based on other URL information (an example of a second reacquiring section).

[Print-Target Determining Process]

Figure 7:
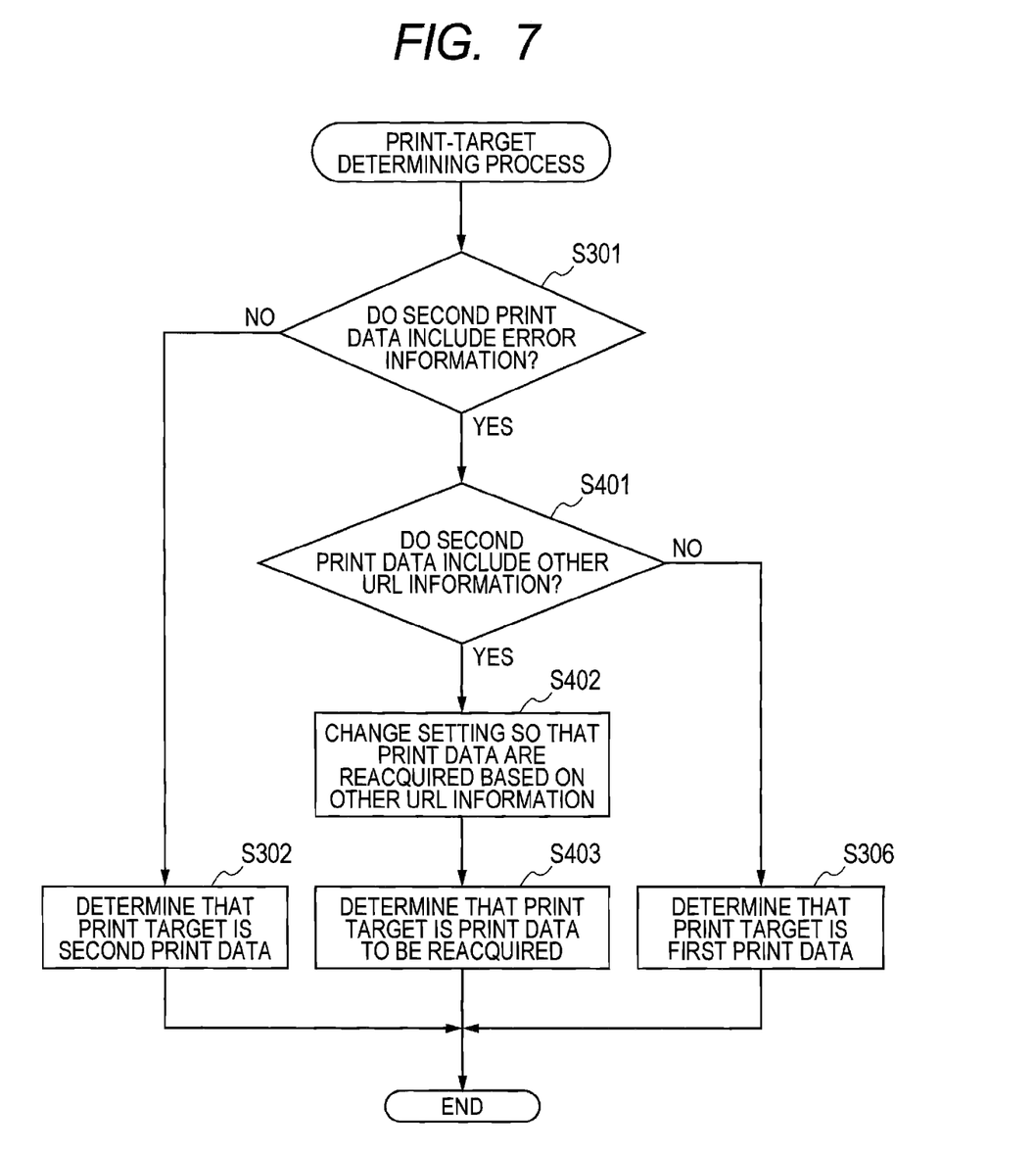
FIG. 7 is a flowchart showing steps in a print-target determining process according to a second embodiment of the invention.

The print-target determining process of the second embodiment will be described while referring to the flowchart of FIG. 7. Note that descriptions for processes similar to those in the print-target determining process of the first embodiment will be omitted as appropriate.

If it is determined that the second print data include error information (S301: Yes), in S401, the CPU 31 determines whether the second print data include other URL information. This determination in S401 is performed by determining whether the second print data include a character string such as "Our homepage has been moved. You will be redirected in five seconds."

If it is determined that the second print data include other URL information (S401: Yes), the CPU 31 extracts the other URL information from the source code of the Web page and changes setting so that print data are reacquired based on the extracted other URL information (S402). For example, the CPU 31 extracts [http://example.com/] from [meta http-equiv="Refresh"content="10; URL=http://example.com/"].

Then, the CPU 31 determines that the print target is print data that are reacquired from the Web server 300 based on the other URL information (S403), and ends the print-target determining process.

Advantageous Effects of the Second Embodiment

As described above in detail, in the printer 100 of the second embodiment, if the CPU 31 determines that the second print data include other URL information (S401: Yes), the CPU 31 changes setting so that print data are reacquired based on the other URL information (S402). Then, the CPU 31 determines that the print target is print data that are reacquired from the Web server 300 based on the other URL information (S403). Hence, if the status code includes other URL information, print data reacquired from the other URL information are printed. Thus, it is likely that the user obtains a desired print result.

Third Embodiment

Figure 8:
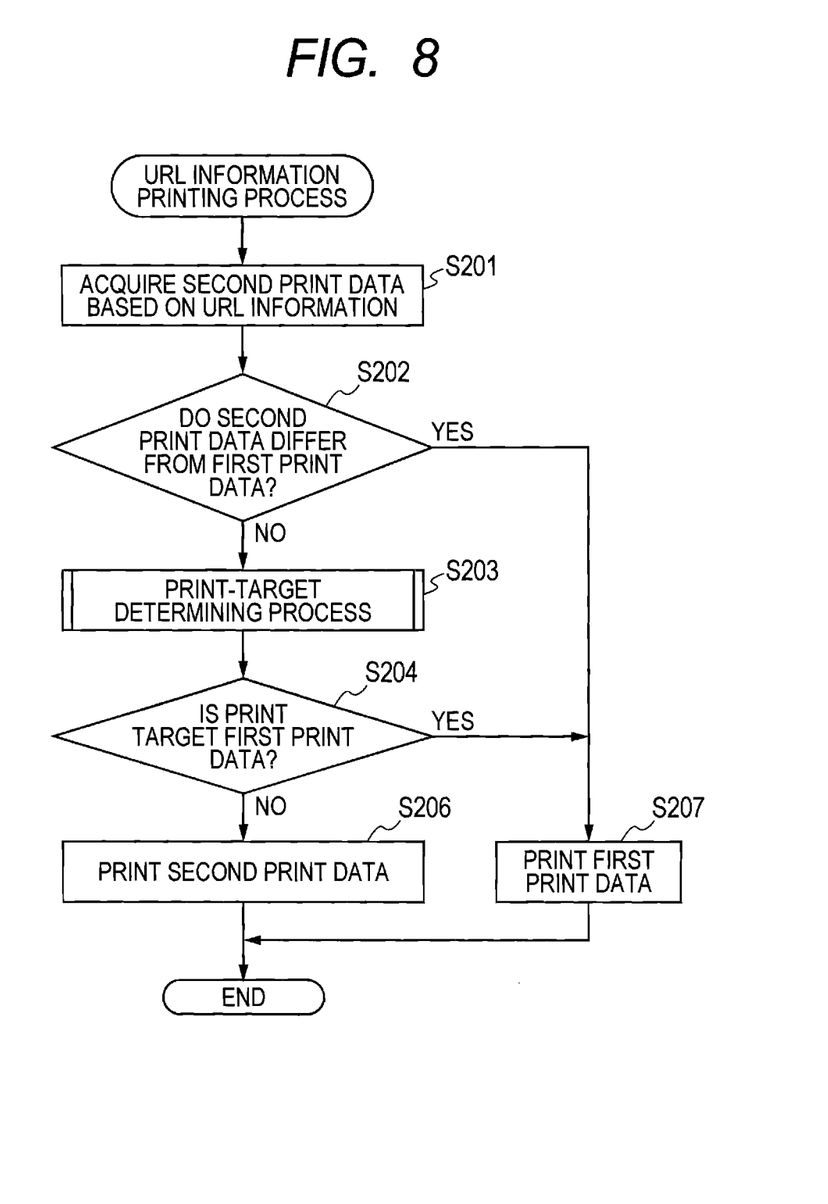
FIG. 8 is a flowchart showing steps in a URL information printing process according to a third embodiment of the invention.
Figure 9:
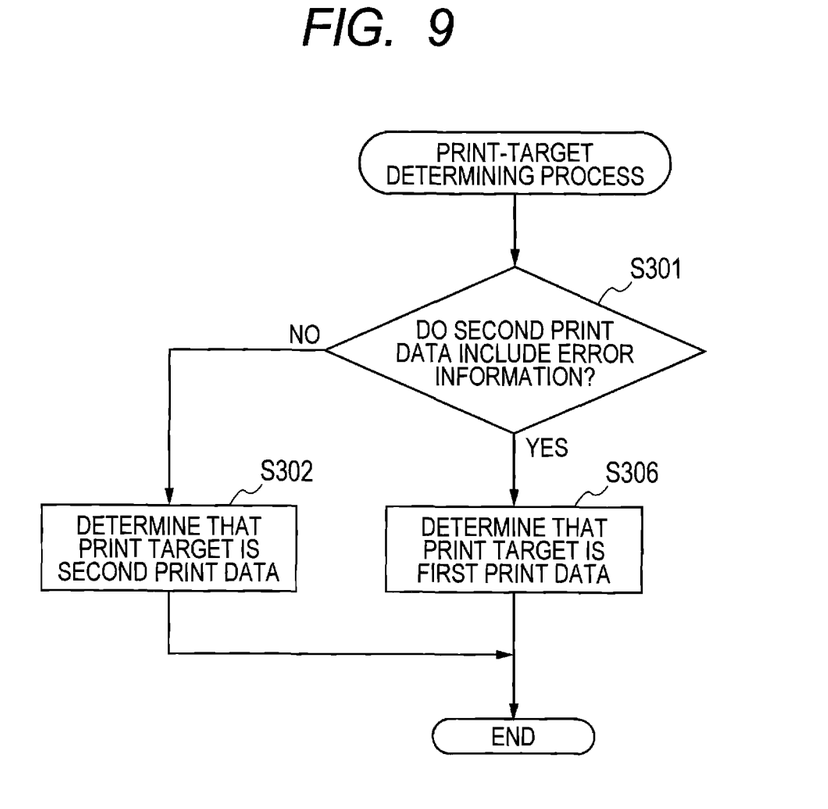
FIG. 9 is a flowchart showing steps in a print-target determining process according to the third embodiment.

As shown in FIGS. 8 and 9, a URL information printing process and a print-target determining process of the third embodiment differ from those in the first and second embodiments. In the print-target determining process of the third embodiment (FIG. 9), the CPU 31 only determines whether second print data include error information (S301).

[URL Information Printing Process]

The URL information printing process of the third embodiment will be described while referring to FIG. 8. In the third embodiment, there is no process of determining whether print data need to be reacquired (S205 in FIG. 5).

That is, the processes in S201-S203 are the same. Subsequent to S203, the CPU 31 determines whether to print the first print data (S204). If the CPU 31 determines that the first print data are not to be printed (S204: No), the CPU 31 controls the image forming section 10 to print the second print data (S206) and ends the URL information printing process. If the CPU 31 determines that the first print data are to be printed (S204: Yes), the CPU 31 controls the image forming section 10 to print the first print data (S207) and ends the URL information printing process.

If it is determined that the first print data are identical to the second print data (S202: No), the CPU 31 controls the image forming section 10 to print the first print data (S207) and ends the URL information printing process.

[Print-Target Determining Process]

As shown in FIG. 9, in the print-target determining process of the third embodiment, the CPU 31 determines whether the second print data include error information (S301). If it is determined that the second print data do not include error information (S301: No), the CPU 31 determines that the print target is the second print data (S302) and ends the print-target determining process.

If it is determined that the second print data include error information (S301: Yes), the CPU 31 determines that the print target is the first print data (S306) and ends the print-target determining process.

Advantageous Effects of the Third Embodiment

As described above in detail, in the printer 100 of the third embodiment, if it is determined that the second print data are unnecessary, the CPU 31 controls the image forming section 10 to print the first print data (S207). Thus, even if the first print data differ from the second print data, the first print data including the user's desired content are printed. Hence, it is likely that the user obtains a desired print result.

[Modifications]

While the invention has been described in detail with reference to the above aspects thereof, it would be apparent to those skilled in the art that various changes and modifications may be made therein without departing from the scope of the claims. In the following descriptions, like parts and components are designated by the same reference numerals to avoid duplicating description.

For example, the printing device of the invention may be a printer, a multifunction device, a copier, and the like that have a printing function.

In the above-described embodiments, printing of a print job stored in the printer is started in accordance with operations on the operation panel 40. Nevertheless, the disclosure may not be limited to the specific embodiment thereof. For example, printing may be started in accordance with a print instruction from a mobile device, authentication using a card reader, or the like.

In the above-described embodiments, the user operates the operation panel 40 to input an instruction for performing Web page printing. Nevertheless, the disclosure may not be limited to the specific embodiment thereof. For example, an instruction for performing Web page printing may be automatically generated when a predetermined requirement is satisfied (an example of a print instruction). Specifically, when the user sends URL information for referring to a Web page from the PC 200 to the printer 100, a scheduled print time is also sent from the PC 200 to the printer 100. At the scheduled print time, the printer 100 acquires print data using URL information stored in the NVRAM 34.

In the above-described embodiments, the URL information and the first print data are stored in the NVRAM 34 in association with each other (S103) in a non-volatile state. However, another configuration may be adopted as long as the URL information remains memorized (stored) until printing of the first or second print data is completed after the first or second print data are acquired from a Web page based on the URL information. For example, the URL information may be continuously memorized in a temporary storage section such as the RAM 33 until printing of the first or second print data is completed after the URL information is inputted. Further, for example, the URL information may be stored in a flash memory mounted on the USB interface 38.

In the above-described embodiments, at first timing, a user sends URL information for referring to a Web page from the PC 200 to the printer 100 (that is, the PC 200 receives a print job), and the printer 100 acquires first print data from the Web page based on the URL information and stores the first print data in the NVRAM 34. Then, at second timing subsequent to the first timing, the user operates the operation panel 40 to input an instruction for performing Web page printing (that is, a print instruction is given). That is, the printer 100 acquires the first print data immediately after the print job is received. Nevertheless, the disclosure may not be limited to the specific embodiment thereof.

For example, first, the user may send both URL information for referring to a Web page and a preliminary acquisition time from the PC 200 to the printer 100, and the printer 100 may acquire first print data from the Web page based on the URL information at the preliminary acquisition time (in other words, when a print job is received, URL information is stored in the printer 100 but first print data are not stored in the NVRAM 34 yet). Then, the user may operate the operation panel 40 to input an instruction for performing Web page printing. That is, as long as there is sufficient time before the user inputs an instruction for performing Web page printing, the first print data need not be acquired from the Web page based on the URL information immediately after the user sends URL information for referring to the Web page from the PC 200 to the printer 100. In this case, because a memory area of the NVRAM 34 is not used until the preliminary acquisition time, the memory area of the NVRAM 34 can be used for another use. Thus, the NVRAM 34 can be utilized efficiently.

Further, for example, instead of the printer 100 itself acquiring first print data from the Web server 300, URL information of a Web page may be inputted on the PC 200, the PC 200 may access the Web server 300 to acquire print data, and the PC 200 may send the print data, as well as the URL information of the Web page, to the printer 100. Then, the user may operate the operation panel 40 to input an instruction for performing Web page printing.

Hence, it is unnecessary for the printer 100 itself to acquire first print data prior to a print instruction. Thus, the first print data are not acquired while the printer 100 is performing another control, thereby reducing a load on the printer 100. Note that an information processing device for sending URL information of a Web page to the printing device is not limited to a PC, but may be a mobile device such as a smart phone, for example.

In the above-described embodiments, the printer 100 determines whether the second print data are identical to the first print data having the same URL information and stored in the NVRAM 34, by comparing and determining character strings of the second print data and the first print data. Nevertheless, the disclosure may not be limited to the specific embodiment thereof. For example, when the printer 100 accesses a directory of the Web server 300 based on the selected URL information, the printer 100 inquires of the Web server 300 whether the first print data are updated after the first print data are stored in the NVRAM 34. Then, the printer 100 may determine whether the first print data are updated based on an inquiry result of the Web server 300.

In the above-described embodiments, the printer 100 determines whether second print data are necessary. Nevertheless, the disclosure may not be limited to the specific embodiment thereof. For example, the printer 100 may determine whether it is necessary to store the second print data in the NVRAM 34 or the like.

In the above-described embodiments, when the printer 100 determines whether second print data are necessary, the printer 100 determines whether the second print data include a character string that is the same as the status code of "403: Forbidden", "404: Not Found", "502: Bad Gateway", or "503: Service Unavailable" (S301). Nevertheless, the disclosure may not be limited to the specific embodiment thereof. For example, the printer 100 may determine that the second print data are unnecessary, based on other status codes.

In the print-target determining process in the above-described second embodiment, if the second print data include a predetermined character string, print data are reacquired from other URL information indicated in a source code of a Web page. Nevertheless, the disclosure may not be limited to the specific embodiment thereof. For example, if the second print data include a character string of any status code of "301: Moved Permanently", "302: Found", "303: See Other", or "307: Temporary Redirect", print data may be reacquired, together with the status code, from other URL information indicated in the source code.

Note that, if the status code of "301: Moved Permanently", "302: Found", "303: See Other", or "307: Temporary Redirect" is received, it is likely that an access is made in a directory of the Web server 300 based on inputted URL information but that there is no print data in the directory. In this case, information received from the Web server 300 sometimes include URL information indicating a moved location of print data. If URL information indicating a moved location of print data is included, the URL information is temporarily stored in the RAM 33, an access is made to the directory of the moved location, and print data can be downloaded to the memory area of the printer 100. Thus, by printing print data of URL information indicating a moved location, it is likely that the user obtains a desired print result.

When the printer 100 determines whether second print data are necessary, the printer 100 may determine whether the second print data include information that prohibits printing, such as prohibition of printing and prohibition of reproduction. If the second print data include information that prohibits printing, the printer 100 may determine that the second print data are unnecessary.

When the printer 100 determines whether second print data are necessary, the printer 100 may determine whether the second print data include a part that cannot be displayed. If the second print data include a part that cannot be displayed, the printer 100 may determine that the second print data are unnecessary. Specifically, second print data sometimes include a part that cannot be displayed due to insufficient memory of the printer 100 or the PC 200. Further, second print data include a part that cannot be displayed when the second print data include an image etc. with a broken link. In addition, second print data include a part that cannot be displayed when comparison is made between the first print data and the second print data, and an image etc. existing in the first print data does not exist in the second print data.

When the printer 100 determines whether second print data are necessary, the printer 100 may allow the user to input a file type (pdf, jpg, etc.) of a file included in the print data, a keyword, an existence of an image, etc., and may determine whether a condition inputted by the user is satisfied. The printer 100 may determine that the second print data are unnecessary if the second print data do not satisfy the condition inputted by the user.

When the printer 100 determines whether second print data are necessary, the printer 100 may determine whether the second print data cannot be printed because the second print data are beyond the printing ability of the printer 100. If the second print data are beyond the printing ability of the printer 100 and cannot be printed, the printer 100 determines that the second print data are unnecessary. Specific cases include a case in which the printer 100 cannot interpret the second print data and hence cannot perform printing, a case in which the printer 100 does not support a data format of the second print data, and a case in which the printer 100 cannot deal with a font included in the second print data.

In the above-described embodiments, when the CPU 31 extracts other URL information from a source code of a Web page, the CPU 31 extracts [http://example.com/] from [meta http-equiv="Refresh"content="10; URL=http://example-.com/"], for example. Nevertheless, the disclosure may not be limited to the specific embodiment thereof. For example, the CPU 31 may extract a character string of other URL information from a Web page informing that the Web page has been moved.

Although, in the above-described embodiments, status codes of "502: Bad Gateway" and the like are described as examples, the status codes are not limited to these examples. Further, error types are not limited to ones relating to the above-mentioned status codes. Various status codes and error types may be used.

In the above-described embodiments, a single CPU may perform all of the processes. Nevertheless, the disclosure may not be limited to the specific embodiment thereof, and a plurality of CPUs, a special application specific integrated circuit ("ASIC"), or a combination of a CPU and an ASIC may be used to perform the processes.

What is claimed is:

1. A printing device comprising:
   a storage section;
   a first acquiring section configured to acquire, at first timing after a print job is received and before a print instruction is given, first print data located at a reference location indicated by reference information of data included in the print job, and to store the first print data in the storage section;
   a second acquiring section configured to acquire, at second timing when the print instruction is given, second print data located at the reference location;
   a difference determining section configured to determine whether the second print data are different from the first print data;
   a necessity determining section configured to determine whether the second print data are necessary, when the difference determining section determines that the second print data are different from the first print data;
   a printing section configured to print the second print data when the necessity determining section determines that the second print data are necessary, and to print the first print data when the necessity determining section determines that the second print data are unnecessary;
   an error determining section configured to determine whether the second print data include error information; and
   a first reacquiring section configured to reacquire print data from the reference location of the first print data, when the error information is temporary error information,
   wherein the necessity determining section is configured to determine that the second print data are unnecessary when the error determining section determines that the second print data include error information,
   wherein the difference determining section is configured to determine whether the print data reacquired by the first reacquiring section are different from the first print data,
   wherein the necessity determining section is configured to determine whether the print data reacquired by the first reacquiring section are necessary, when the difference determining section determines that the print data reacquired by the first reacquiring section are different from the first print data, and
   wherein the printing section is configured to print the print data reacquired by the first reacquiring section when the necessity determining section determines that the print data reacquired by the first reacquiring section are necessary.

2. The printing device according to claim 1, wherein the necessity determining section is configured to determine whether printing is necessary for the second print data.

3. The printing device according to claim 1, further comprising a receiving section configured to receive the print instruction by a user,
   wherein the storage section is configured to store the first print data before the receiving section receives the print instruction.

4. The printing device according to claim 1, wherein the storage section is configured to store the reference information, without storing the first print data, when the print job is received.

5. The printing device according to claim 1, wherein the storage section is configured to store both the first print data and the reference information when the print job is received.

6. The printing device according to claim 1, wherein the first acquiring section is configured to acquire the first print data immediately after the print job is received.

7. The printing device according to claim 1, further comprising a preliminary-acquisition-time acquiring section configured to acquire a preliminary acquisition time when the print job is received,
   wherein the first acquiring section is configured to acquire the first print data at the preliminary acquisition time.

8. A printing device comprising:
   a processor;
   a network interface connectable to a network;
   a memory storing a set of program instructions executable by the processor, the set of program instructions comprising:
      acquiring, at first timing after a print job is received and before a print instruction is given, first print data located at a reference location indicated by reference information of data included in the print job, and storing the first print data in the memory;
      acquiring, at second timing when the print instruction is given, second print data located at the reference location;
      determining whether the second print data are different from the first print data;
      determining whether the second print data are necessary, when the second print data are different from the first print data;
      reacquiring print data from the reference location of the first print data, when the error information is temporary error information;
      determining whether reacquired print data are different from the first print data and
      determining whether the reacquired print data are necessary, when the reacquired print data are different from the first print data; and
   a printing section configured to print the second print data when the second print data are necessary, and to print the first print data when the second print data are unnecessary,
   wherein the set of program instructions further comprises determining whether the second print data include error information,
   wherein the instructions for determining whether the second print data are necessary comprise determining that the second print data are unnecessary when the second print data include error information, and
   wherein the printing section is configured to print the reacquired print data, when the reacquired print data are necessary.

9. The printing device according to claim 8, wherein the instructions for determining whether the second print data are necessary comprise determining whether printing is necessary for the second print data.

10. The printing device according to claim 8, further comprising a receiving section configured to receive the print instruction by a user,
   wherein the memory is configured to store the first print data before the receiving section receives the print instruction.

11. The printing device according to claim 8, wherein the memory is configured to store the reference information, without storing the first print data, when the print job is received.

12. The printing device according to claim 8, wherein the memory is configured to store both the first print data and the reference information when the print job is received.

13. The printing device according to claim 8, wherein the instructions for acquiring the first print data comprise acquiring the first print data immediately after the print job is received.

14. The printing device according to claim 8, wherein the set of program instructions further comprises acquiring a preliminary acquisition time when the print job is received; and
   wherein the instructions for acquiring the first print data comprise acquiring the first print data at the preliminary acquisition time.

15. A printing device comprising:
   a storage section;
   a first acquiring section configured to acquire, at first timing after a print job is received and before a print instruction is given, first print data located at a reference location indicated by reference information of data included in the print job, and to store the first print data in the storage section;
   a second acquiring section configured to acquire, at second timing when the print instruction is given, second print data located at the reference location;
   a difference determining section configured to determine whether the second print data are different from the first print data;
   a necessity determining section configured to determine whether the second print data are necessary, when the difference determining section determines that the second print data are different from the first print data;
   a printing section configured to print the second print data when the necessity determining section determines that the second print data are necessary, and to print the first print data when the necessity determining section determines that the second print data are unnecessary;
   an error determining section configured to determine whether the second print data include error information; and
   a reacquiring section configured to reacquire print data from the reference location included in the error information, when the error information includes a reference location different from the reference location of the first print data,
   wherein the necessity determining section is configured to determine that the second print data are unnecessary when the error determining section determines that the second print data include error information,
   wherein the difference determining section is configured to determine whether the print data reacquired by the reacquiring section are different from the first print data,
   wherein the necessity determining section is configured to determine whether the print data reacquired by the reacquiring section are necessary, when the difference determining section determines that the print data reacquired by the reacquiring section are different from the first print data, and
   wherein the printing section is configured to print the print data reacquired by the reacquiring section, when the necessity determining section determines that the print data reacquired by the reacquiring section are necessary.

16. The printing device according to claim 15, wherein the necessity determining section is configured to determine whether printing is necessary for the second print data.

17. The printing device according to claim 15, further comprising a receiving section configured to receive the print instruction by a user,
   wherein the storage section is configured to store the first print data before the receiving section receives the print instruction.

18. The printing device according to claim 15, wherein the storage section is configured to store the reference information, without storing the first print data, when the print job is received.

19. The printing device according to claim 15, wherein the storage section is configured to store both the first print data and the reference information when the print job is received.

20. The printing device according to claim 15, wherein the first acquiring section is configured to acquire the first print data immediately after the print job is received.

21. The printing device according to claim 15, further comprising a preliminary-acquisition-time acquiring section configured to acquire a preliminary acquisition time when the print job is received,
   wherein the first acquiring section is configured to acquire the first print data at the preliminary acquisition time.

22. A printing device comprising:
   a processor;
   a network interface connectable to a network;
   a memory storing a set of program instructions executable by the processor, the set of program instructions comprising:
      acquiring, at first timing after a print job is received and before a print instruction is given, first print data located at a reference location indicated by reference information of data included in the print job, and storing the first print data in the memory;
      acquiring, at second timing when the print instruction is given, second print data located at the reference location;
      determining whether the second print data are different from the first print data;
      determining whether the second print data are necessary, when the second print data are different from the first print data;
      determining whether the second print data include error information;
      reacquiring print data from a reference location included in the error information, when the error information includes the reference location different from the reference location of the first print data;
      determining whether reacquired print data are different from the first print data; and
      determining whether the reacquired print data are necessary, when the reacquired print data are different from the first print data; and a printing section configured to print the second print data when the second print data are necessary, and to print the first print data when the second print data are unnecessary, wherein the instructions for determining whether the second print data are necessary comprise determining that the second print data are unnecessary when the second print data include error information, and wherein the printing section is configured to print the reacquired print data, when the reacquired print data are necessary.

23. The printing device according to claim 22, wherein the instructions for determining whether the second print data are necessary comprise determining whether printing is necessary for the second print data.

24. The printing device according to claim 22, further comprising a receiving section configured to receive the print instruction by a user, wherein the memory is configured to store the first print data before the receiving section receives the print instruction.

25. The printing device according to claim 22, wherein the memory is configured to store the reference information, without storing the first print data, when the print job is received.

26. The printing device according to claim 22, wherein the memory is configured to store both the first print data and the reference information when the print job is received.

27. The printing device according to claim 22, wherein the instructions for acquiring the first print data comprise acquiring the first print data immediately after the print job is received.

28. The printing device according to claim 22, wherein the set of program instructions further comprises acquiring a preliminary acquisition time when the print job is received; and wherein the instructions for acquiring the first print data comprise acquiring the first print data at the preliminary acquisition time.

* * * * *